United States Patent Office 3,245,974
Patented Apr. 12, 1966

3,245,974
LINEARLY FUSED POLYCYCLIC POLYMERS
AND PROCESS
Rudolph J. Angelo, Wilmington, Del., assignor to E. I.
du Pont de Nemours and Company, Wilmington, Del.,
a corporation of Delaware
No Drawing. Filed June 6, 1962, Ser. No. 200,338
5 Claims. (Cl. 260—94.2)

This invention relates to organic polymers derived from diolefins and more particularly to a process for producing novel linearly fused polycyclic polymers.

It has been recognized that polymers having a linearly fused cyclic structure (ladder polymer) show outstanding properties such as thermal stability, high modulus and high tenacity. Up to this time, however, satisfactory methods for preparing such polymers, especially hydrocarbon polymers of this type, have not been available.

Accordingly, it is an object of this invention to provide a process for the preparation of linearly fused cyclic polymers. A further object is to provide a process for the preparation of linearly fused cyclohexane polymers from diolefin hydrocarbons of the class hereinafter specified, said polymers being capable of being readily converted into film and like shaped structures. The foregoing and related objects will more clearly appear from the description which follows.

The objects are realized by the present invention which, briefly stated, comprises the steps of dissolving a 1,6-polyene polymer having the structure:

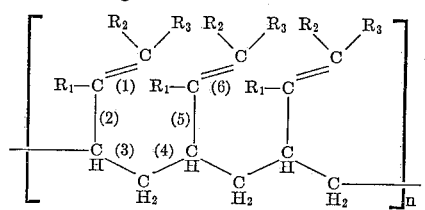

wherein $n$ is an integer not less than 50, $R_1$ is selected from the group consisting of hydrogen, alkyl and alkenyl groups having 1–6 carbon atoms and aryl groups, $R_2$ and $R_3$ are selected from the group consisting of hydrogen and alkyl groups having 1–6 carbon atoms wherein $R_1$ is a hydrogen atom when $R_2$ and $R_3$ are alkyl groups, $R_2$ and $R_3$ are hydrogen atoms when $R_1$ is selected from the group consisting of alkyl and alkenyl groups of 1–6 carbon atoms and aryl groups, and wherein the unsatisfied valences are satisfied by attachment to other recurring groups, to hydrogen atoms or by formation of double bond between the carbon atom bearing the unsatisfied valence and an adjacent carbon atom, in an inert solvent therefor at a concentration not greater than 1.0% by weight, based on the total weight of the solution, and subjecting said dissolved polymer to the action of a cationic condensing agent, whereby to convert said polymer into a linearly fused polycyclic polymer having the structure:

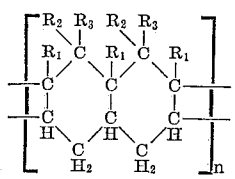

wherein $n$ is an integer not less than 50, $R_1$ is selected from the group consisting of hydrogen, alkyl and alkenyl groups having 1–6 carbon atoms and aryl groups, $R_2$ and $R_3$ are selected from the group consisting of hydrogen, and alkyl groups having 1–6 carbon atoms and wherein $R_1$ is a hydrogen atom when $R_2$ and $R_3$ are alkyl groups and $R_2$ and $R_3$ are hydrogen atoms when $R_1$ is selected from the group consisting of alkyl and alkenyl of 1–6 carbon atoms and aryl groups, wherein the unsatisfied valences are satisfied by attachment to other recurring groups, to hydrogen atoms or by formation of a double bond between adjacent carbon atoms bearing the unsatisfied valences.

The terminology "1,6-polyene polymer" is employed herein to identify a polymer having many double bonds (i.e., polyene), the double bonds being located at positions 1, 6 to each other as illustrated in the structural formula above.

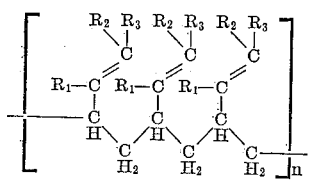

wherein $n$ is an integer not less than 50, $R_1$ is selected from the group consisting of hydrogen, alkyl and alkenyl groups having 1–6 carbon atoms and aryl groups, $R_2$ and $R_3$ are selected from the group consisting of hydrogen and alkyl groups having 1–6 carbon atoms wherein $R_1$ is a hydrogen atom when $R_2$ and $R_3$ are alkyl groups and $R_2$ and $R_3$ are hydrogen atoms when $R_1$ is selected from the group consisting of alkyl and alkenyl groups of 1–6 carbon atoms and aryl groups, suitable for purposes of this invention are readily prepared by polymerizing in known manner monomers of the general formula:

$$CH_2=CH-CR_1=CR_2R_3$$

wherein $R_1$ is selected from the group consisting of hydrogen, alkyl and alkenyl groups having 1–6 carbon atoms and aryl groups, $R_2$ and $R_3$ are selected from the group consisting of hydrogen, and alkyl groups having 1–6 carbon atoms and wherein $R_1$ is a hydrogen atom when $R_2$ and $R_3$ are alkyl groups and $R_2$ and $R_3$ are hydrogen atoms when $R_1$ is selected from the group consisting of alkyl and alkenyl of 1–6 carbon atoms and aryl groups. The preferred monomer of the class defined is isoprene. As representative additional monomers there may be mentioned 2-(4-methyl-3-pentenyl)-1,3-butadiene; 4-methyl-pentadiene-1,3; 3-methyl-pentadiene-1,3; 2-ethyl-butadiene-1,3; 3-methylhexadiene-1,3; 4-methylhexadiene-1,3; 2-isopropylbutadiene-1,3; 2-butylbutadiene-1,3; 3-ethyl-heptadiene-1,3; 3,7-dimethyl octadiene-1,3; 2-tolyl-butadiene-1,3; and 2-xylyl-butadiene-1,3.

Any solvent for the 1,6-polyene polymer, which is chemically inert with respect to the polymer and cationic condensing agents, may be employed for the cyclization reaction of this invention. Thus hydrocarbons such as benzene, toluene, o-xylene, cyclohexane, heptane, halogenated hydrocarbons such as chlorobenzene, bromobenzene, o-dichlorobenzene, tetrachloroethylene, and heterocyclics such as tetrahydrofurane and dioxane are representative suitable solvents. A critical feature of this invention is that the concentration of 1,6-polyene polymer in the solution shall not be greater than about 1% by weight of polymer, based on the total weight of the solution. Higher concentrations result in the production of insoluble products which are not convertible to useful films or other shaped structures. Solutions containing as little as 0.1% of polymer may be used. However, the best results are obtained at concentrations below 0.5%, preferably from 0.2% to 0.25%.

Examples of cationic agents which may be used for the cyclization of 1,6-polyene polymers in accordance with this invention include boron trifluoride, boron trifluoride-etherate, phosphorus oxychloride, ferric chloride, aluminum chloride, aluminum tribromide, methyl aluminum sesquibromide, titanium tetrachloride, stannic chloride, stannous chloride, beryllium chloride, zinc chloride, aluminum triiodide, hydrogen fluoride, sulfuric acid, phosphoric acid and polyphophoric acid. The amount of condensing agent may be varied from 1% to 100% based on the weight of the polymer with 50% to 100% being preferred.

The reaction temperature is not expecially critical. It is convenient to run the cyclizations at a temperature between 25° C. and 100° C. However, reactions can be carried out at temperature as low as −80° C. and up to 150° C.

Preferably the reaction is continued until a product having substantially no residual unsaturation is obtained. However, useful products are obtained when the reaction is terminated with the production of a product having as much as, but not more than, 15% unsaturation.

The following specific examples will serve to further illustrate the principles and practice of my invention.

EXAMPLE I

Cyclization of poly-3,4-isoprene

A. PREPARATION OF POLY-3,4-ISOPRENE

Poly-3,4-isoprene was prepared essentially according to the method described by Natta, French patent, 1,154,938, as follows: A one liter reaction flask equipped with a stirrer, thermometer, nitrogen inlet tube and reflux condenser was baked dry by employing a stream of nitrogen. Heptane (100 ml.—carefully dried) was added to the reaction vessel followed by 0.14 mole of aluminum triethyl (87.5 ml. of 1.6 molar solution in heptane) and 0.03 mole of tetraisopropyl titanate (30 ml. of 1.0 molar solution in heptane). This brown-black mixture was stirred for 30 minutes while the temperature was maintained at 20° C. using a water bath. Distilled and dried isoprene (136 g.—2.0 mole) was injected and the mixture was vigorously stirred under dry nitrogen. The temperature was maintained at 18–20° C. using a water bath. After 8 hours the reaction mixture was significantly more viscous and an additional 50 ml. of heptane was added. After 24 hours a very viscous black reaction mixture was isolated by precipitation in a large Waring blendor with an excess of a cold isopropanol/hydrochloric acid mixture. The product was then washed twice in a blendor with acidified ethanol containing several milliliters of a saturated antioxidant solution (phenyl beta-naphthylamine), twice with ethanol and once with acetone. The product was quite gummy, difficult to handle and extremely susceptible to air oxidation so that the isolation and washing procedures were accomplished in a minimum of time without overexposure to the atmosphere. The white, tough, rubbery polymer was vacuum dried at 25° C. with a nitrogen bleed for 24 hours to yield 62.1 grams (45.5% yield) of polyisoprene. The polymer was soluble in hydrocarbons, tetrahydrofurane and carbon disulfide. The infrared spectrum showed strong absorption at 888 cm.$^{-1}$ and weak absorption at about 840 cm.$^{-1}$ indicating the product to consist of approximately 90% of poly-3,4-isoprene and 10% of poly-1,4-isoprene. The inherent viscosity (0.5 gram in 100 ml. of toluene at 30° C.) was 1.63.

B. CYCLIZATION OF POLY-3,4-ISOPRENE

A four liter reaction flask equipped with an efficient stirrer, thermometer, dry nitrogen inlet tube and reflux condenser was baked dry while a constant flow of nitrogen was maintained. To the cooled and dried reaction apparatus there was added 10.0 grams of the above-described polyisoprene (as 200 ml. of a standard 5.0% solution in benzene) and 3700 ml. of anhydrous benzene. The solution was heated to a gentle reflux (80° C.) while vigorous stirring and nitrogen bubbling were maintained. A solution containing 5.0 ml. (8.4 grams or 0.05 mole) of POCl$_3$ in 100 ml. of benzene was injected with a hypodermic syringe over a period of one hour. The polymer concentration in benzene was 0.25%. A slight pink color developed and became progressively darker as the reaction continued. Refluxing conditions were continued for 16 hours after which the solution was cooled and the product was isolated. At the end of the reaction little or no insoluble residue was evident. The product was isolated by precipitation in a large excess of ethanol (10 liters) and was separated as a non-tacky white-to-cream colored solid. The product was washed several times with ethanol and acetone, vacuum dried at 25° C. under nitrogen to yield 8 grams of polymeric product having a softening point between 135–140° C. The inherent viscosity (0.5 gram in 100 ml. of toluene at 30° C.) was about 0.5. An infrared spectrum of the product showed only a trace of absorption at 888 cm.$^{-1}$ indicating that the poly-3,4-isoprene portion of the starting material had been essentially completely cyclized.

C. STRUCTURE DETERMINATION

A 10.0 gram sample of the product described in the preceding section (a mixture of several runs) was intimately mixed with 4.0 grams of rhodium-on-alumina catalyst (5% Rh) and heated in a nitrogen atmosphere for four days. An efficient condenser was provided to prevent escape of volatile liquid; no attempt was made to condense the off gases. Oil bath heating was maintained at 300° C. for the first 24 hours and was then held at 340° C. for the next three days. Dry nitrogen was bubbled through the molten polymer very slowly. An evolution of gas was evident during the initial period of dehydrogenation; condensation of volatile liquid (pale yellow-green) was observed after the first day. The dark tarry residue that formed was vacuum distilled to yield 2.2 grams of liquid boiling at 52–185° C. per 0.7 mm. The temperature of the pot was slowly increased to the temperature level at which the dehydrogenation was carried out (340–350° C.). The first few drops of distillate were colorless; the distillate became progressively darker thereafter. During the last part of the distillation the vapors were pale yellow-green. Examination of the ultra-violet spectra and the fluorescent emission spectra of the distillate gave well resolved spectral characteristics of naphthalene, anthracene and naphthacene derivatives, evidence that the original product has a linear fused polycyclic structure.

EXAMPLE II

Effect of concentration on cyclization

A series of experiments was carried out to determine the effect of concentration of the polymer in the solvent on the character of polymer obtained. The cyclizations were carried out with phosphorus oxychloride condensing agent at 80° C. using benzene as the solvent and the polymeric material was that described under Example I-A. The time of the reaction was 18 hours in each case. The results are shown in the following table:

| Experiment No. | Polymer Concentration (gram/100 g. solvent) | Inherent Viscosity of Product (0.1 g. in 100 ml. of benzene—30° C.) |
|---|---|---|
| 1 | 0.125 | 0.47. |
| 2 | 0.250 | 0.73. |
| 3 | 1.0 | Slightly soluble. |
| 4 | 2.0 | Insoluble. |
| 5 | 10.0 | Insoluble. |

Both the products of the Experiments 1 and 2 were soluble in organic solvents and could be melt pressed into films whereas the product of Experiment 3 was sparingly soluble and that from Experiments 4 and 5 were both completely insoluble in organic solvents and could not be melt pressed into a film. The properties of a melt pressed film from Experiment 1 were: modulus—251,000 p.s.i.; elongation—1.9%; tenacity—4,500 p.s.i.; from a film solvent cast from tetrahydrofurane the properties were modulus—270,000 p.s.i.; elongation—1%; tenacity—2,600 p.s.i. Melt pressed film from Experiment 2 had the following properties: modulus—257,000 p.s.i.; elongation—1.8%; tenacity—4,000 p.s.i.; a film cast from tetrahydrofurane had modulus—266,000 p.s.i.; elongation—1.4% and tenacity—3,200 p.s.i.

EXAMPLE III

The cyclization of poly-3,4-isoprene composition (Example I-A) was carried out in heptane solvent at a concentration of 0.1% with boron trifluoride as catalyst at a concentration of 0.10%; the reaction was carried out at 25° C. for 24 hours; the product had an inherent viscosity of 0.67 as measured in 0.1 gram of the polymer in 100 ml. of heptane. The product was melt pressed into a clear, tough film.

EXAMPLE IV

The procedure of Example III was repeated but with boron trifluoride/diethyl ether complex as the condensing agent, toluene as the solvent, at a polymer concentration of 0.125%; reaction temperature was 107° C. and the reaction time was three hours. A 70% yield of product was obtained having an inherent viscosity of 0.31 (0.5 gram of the polymer in 100 ml. of toluene at 30° C.). Clear films were cast from a tetrahydrofurane solution of the polymer. Similar films were also melt pressed from the polymer.

EXAMPLE V

The procedure of Example III was repeated but with stannic chloride as the catalyst, cyclohexane as the solvent with the concentration of the polymeric material in the solvent of 0.4%. The product had an inherent viscosity of 0.43 (0.1 gram in 100 ml. of cyclohexane at 30° C.) and the polymer was soluble in organic solvents and was melt pressed into a clear film.

EXAMPLE VI

The procedure of Example III was repeated but with aluminum trichloride as the catalyst, with n-heptane as the solvent, concentration of the polymer in the solvent of 0.15%, reaction temperature 35° C.; reaction time 10 hours. The product had an inherent viscosity of 0.32 (0.1 gram in toluene at 30° C.) and was cast into films from the solvent and by melt pressing.

EXAMPLE VII

The procedure of Example I-A was followed for the polymerization of myrcene, 2-(4-methyl-3-pentenyl)-1,3-butadiene. The product was a pale yellow viscous gummy material. Infrared spectra showed the product to be approximately 30% of the 3,4-structure. In a typical reaction, one gram of the polymeric product was dissolved in 400 ml. of benzene (0.25% by weight) and 0.5 ml. of phosphorus oxychloride was added. The reaction was then carried out for 24 hours at 25° C. after which the cyclized product was isolated as described previously. The product had a softening point of 132–137° C.; it was soluble in tetrahydrofurane, in carbon disulfide and in benzene and toluene. It was melt pressed into a clear film by pressing at 150° C. and 30 tons pressure. Following the procedure of Example I-C, ultraviolet spectra characteristics of naphthalene and anthracene derivatives were likewise observed for this product.

EXAMPLE VIII

The monomer 4-methylpentadiene-1,3 was prepared as follows: Isobutyraldehyde (106 grams–1.47 moles) dissolved in 500 ml. of tetrahydrofurane was added to 1100 ml. of 1.6 molar vinyl magnesium chloride (1.76 moles) in tetrahydrofurane over a period of 1.75 hours. Gentle refluxing was maintained during the addition and for three hours after the addition. The cooled reaction mixture was hydrolyzed with 500 ml. of saturated aqueous ammonium chloride solution, the organic layer was separated and the tetrahydrofurane was removed by distillation. The product was isolated by fractional distillation under reduced pressure giving a clear liquid boiling at 41–43° C./21 mm. $N_D^{10}$:1.4316.

The intermediate alcohol product described above was dehydrated by treating with aniline hydrobromide following the method described by Marvel and Woolford, J. Org. Chem. 23 1658 (1958). The product, isolated by fractional distillation, had a boiling point of 76–78° C. with an $N_D^{20}$:1.4411. The product (4-methylpentadiene-1,3) showed an infrared spectrum having strong absorption at 1600 and 1650 cm.$^{-1}$ characteristic of an internal and external double bond and strong absorption at 900 and 1000 cm.$^{-1}$ characteristic of vinyl absorption.

The monomer described above was polymerized with aluminum triethyl/tetraisopropyl titanate catalyst system following the procedure described for the polymerization of isoprene, Example I-A. A white gummy polymer was isolated comprising about 30% of the 3,4-polymer of 4-methylpentadiene-1,3. This was made up into a 0.25% by weight solution in benzene and this solution was treated with phosphorus oxychloride catalyst at 25° C. for a period of 70 hours. The product was a cream colored, non-tacky powder, soluble in tetrahydrofurane, in carbon disulfide and in the hydrocarbon solvents benzene, toluene an cyclohexane. The product had a softening point of 175° C. and its infrared spectrum showed removal of unsaturation in the region of 800–850 cm.$^{-1}$ which is characteristic of a trisubstituted ethylenic group. The product was melt pressed into a clear, tough film. This product also showed a linear cyclic structure as evidenced by ultraviolet spectra characteristics of anthracene derivatives, following the procedure of Example I-C.

EXAMPLE IX

Cyclization of poly(2-phenyl-1,3-butadiene)

Following the procedures outlined in Example I-A and I-B, 2-phenyl-1,3-butadiene (prepared by method described by Marvel and Woolford, J. Org. Chem. 23 1658 (1958) was converted to the intermediate poly-3,4-(2-phenyl-1,3-butadiene) which in turn was cyclized to the linear fused cyclic polymer. The product was melt pressed to give a very stiff, tough film.

It will be apparent from the foregoing description and examples that the process of this invention permits the production of highly useful, high softening, rigid-type polymers with good strength characteristics, from readily available, low cost raw materials such as isoprene and similar diolefins. The products made by the process of this invention moreover are free of residual unsaturation and discoloration which are characteristic of some of the diolefin cyclization products available up to this time. Furthermore, these products are therefore amenable to various shaping operations for conversion into useful articles such as extrusion, molding, as well as solvent coating.

I claim:

1. A process for producing film-forming linearly fused polycyclic organic polymers which comprises the steps of dissolving a 1,6-polyene polymer having the structure:

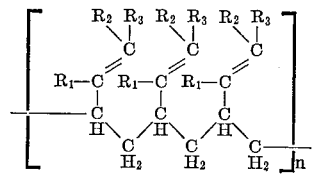

wherein $n$ is an integer not less than 50, $R_1$ is selected from the group consisting of hydrogen, alkyl and alkenyl groups having 1–6 carbon atoms and aryl groups, $R_2$ and $R_3$ are selected from the group consisting of hydrogen and alkyl groups having 1–6 carbon atoms wherein $R_1$ is a hydrogen atom when $R_2$ and $R_3$ are alkyl groups, $R_2$ and $R_3$ are hydrogen atoms when $R_1$ is selected from the group consisting of alkyl and alkenyl groups of 1–6 carbon atoms and aryl groups wherein the unsatisfied valences are satisfied by attachment to other recurring groups, to hydrogen atoms or by formation of double bond between the carbon atom bearing the unsatisfied valence and an adjacent carbon atom, in an inert solvent therefore at a concentration not greater than 1.0% by weight, based on the total weight of the solution, and subjecting said dissolved polymer to the action of a cathionic condensing agent.

2. The process of claim 1 wherein the concentration of said polymeric composition in solution is within the range of from 0.1 to 0.5% by weight.

3. The process of claim 1 wherein said 1,6-polyene polymer is poly-3,4-isoprene.

4. A linearly fused polycyclic polymer having the structure:

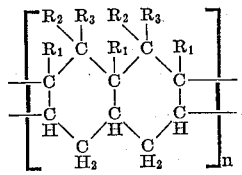

wherein n is an integer not less than 50, $R_1$ is selected from the group consisting of hydrogen, alkyl and alkenyl groups having 1–6 carbon atoms and aryl groups, $R_2$ and $R_3$ are selected from the group consisting of hydrogen, and alkyl groups having 1–6 carbon atoms and wherein $R_1$ is a hydrogen atom when $R_2$ and $R_3$ are alkyl groups and $R_2$ and $R_3$ are hydrogen atoms when $R_1$ is selected from the group consisting of alkyl and alkenyl of 1–6 carbon atoms and aryl groups, wherein the unsatisfied valences are satisfied by attachment to other recurring groups, to hydrogen atoms or by formation of a double bond between adjacent carbon atoms bearing the unsatisfied valences, said polymer being capable of being converted to film.

5. A self-supported film of a linearly fused polycyclic polymer having the structure:

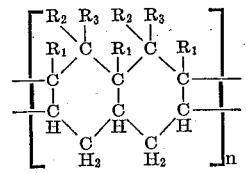

wherein n is an integer not less than 50, $R_1$ is selected from the group consisting of hydrogen, alkyl and alkenyl groups having 1–6 carbon atoms and aryl groups, $R_2$ and $R_3$ are selected from the group consisting of hydrogen, and alkyl groups having 1–6 carbon atoms and wherein $R_1$ is a hydrogen atom when $R_2$ and $R_3$ are alkyl groups and $R_2$ and $R_3$ are hydrogen atoms when $R_1$ is selected from the group consisting of alkyl and alkenyl of 1–6 carbon atoms and aryl groups, wherein the unsatisfied valences are satisfied by attachment to other recurring groups, to hydrogen atoms or by formation of a double band between adjacent carbon atoms bearing the unsatisfied valences.

References Cited by the Examiner

UNITED STATES PATENTS

| | | | |
|---|---|---|---|
| 2,484,614 | 10/1949 | D'Ianni | 260—770 |
| 2,892,004 | 6/1959 | Bartl et al. | 260—770 |

OTHER REFERENCES

Whitby, "Synthetic Rubber" John Wiley & Sons, Inc. (1954) pp. 612–617, Scientific Library Call. No. TS1925–W45–C.6.

JOSEPH L. SCHOFER, *Primary Examiner.*

JAMES A. SEIDLECK, *Examiner.*

C. R. REAP, *Assistant Examiner.*